United States Patent

[11] 3,627,844

| [72] | Inventor | Pierre Legendre |
| | | Pau, France |
| [21] | Appl. No. | 751,034 |
| [22] | Filed | Aug. 8, 1968 |
| [45] | Patented | Dec. 14, 1971 |
| [73] | Assignee | Societe Nationale Des Petroles D'Aquitaine |
| | | Courbevoie, France |
| [32] | Priority | Aug. 9, 1967 |
| [33] | | France |
| [31] | | 117339 |

[54] PREPARATION OF ALKENYL-THIOLS
18 Claims, No Drawings

[52] U.S. Cl...................................................... 260/609 R,
260/468 R, 260/488 R, 260/609 D, 424/335
[51] Int. Cl....................................................... C07c 149/08
[50] Field of Search............................................ 260/609

[56] References Cited
FOREIGN PATENTS

| 6,510,637 | 2/1957 | Netherlands................. | |
| 188,961 | 12/1966 | U.S.S.R........................ | 260/609 A |

OTHER REFERENCES

Abstract No. 188,961 " Soviet Inventions III." (July, 1967) 5; p. 8

Theilheimer " Synthetic Methods" Vol. 6 (1952) p. 19 No. 51

Reid " Org. Chem. of Bivalent Sulfur" Vol. 1 (1958) p. 30

*Primary Examiner*—Alex Mazel
*Assistant Examiner*—D. R. Phillips
*Attorney*—Ostrolenk, Faber, Gerb & Soffen

ABSTRACT: There is provided a novel process for the preparation of certain alkenyl-thiols in particular the preparation of halo-alkenyl-thiols. Novel thiols are also disclosed.

PREPARATION OF ALKENYL-THIOLS

RELATED APPLICATIONS

This application claims priority from French application PV 117339 filed 9th Aug. 1967.

1. Field of the Invention
Preparation of alkenyl-thiols.

2. Description of the Prior Art

The known method for the preparation of alkenyl-thiols consists in causing sodium hydrosulfide to react with a halogenated alkene, this resulting in the elimination of a halogen atom in the form of sodium halide and fixation of the —SH group on the remaining alkenyl. However, this method does not give good yields and, in many cases, it only provides very small proportions of desired thiol; this is for example the case with trichloropropenes, of which the reaction with NaSH permits only small quantities of dichloropropene thiols to be isolated. Another method, which consists in heating a polyhalopropene with thiourea in alcoholic medium gives better results, without however permitting a yield of 35 to 40 percent to be exceeded. As for the methanolysis of haloalkene thioacetates in the presence of sodium, using a known method, this cannot be carried into effect, because of the reaction of the sodium with the halogen.

These general techniques are disclosed in Vol. 5 of Emmet Reid—"Organic Chemistry of Bivalent Sulfur;" the first method is discussed at pages 24–27, and the thiourea method at pages 32–33.

SUMMARY OF THE INVENTION

The present invention resolves the problem which still remains, despite the prior art: it enables various alkene thiols, especially with a substituted alkenyl group, to be obtained with excellent yields, using simple and inexpensive means. It also enables certain new, substituted alkene thiols to be obtained.

The process according to the invention consists in subjecting an alkenyl thioester to the action of an alcohol under heat, in acid medium, and in then extracting the formed thiol from the alcoholic medium.

Because of the simultaneous presence of a double bond and of the —SH group in their molecule, the alkene thiols are starting products which are useful for the preparation of various thio compounds. They can also serve as insecticides or fungicides or as starting material for the production of certain substituted alkenyls.

PREFERRED EMBODIMENTS

The reaction according to the invention can be represented by the alcoholysis equation:

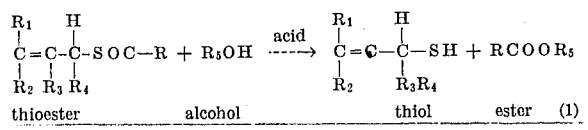

Each of the symbols $R_1$, $R_2$, $R_3$ and $R_4$, which may be like or different, can be a hydrogen or halogen atom, or even and alkyl or aryl radical, for example, methyl, ethyl, propyl, isopropyl, butyl, isobutyl, phenyl, tolyl, etc. The alkyl radicals usually have one to six carbon atoms. R can be any saturated or unsaturated, aliphatic, cyclic or cycloaliphatic radical which is capable of forming part of an organic thio acid; as the thioacetates are the most interesting from an economic point of view, it is these which are most often employed; the radical R particularly employed is thus $CH_3$.

As for $R_5$, which characterizes the alcohol being used, it can be formed by very varied aliphatic radicals, more especially alkyls which contain one to 12 carbon atoms. As the alcohols which in practice are the most readily available contain from one to four carbon atoms, namely, methyl, ethyl, propyl, isopropyl, butyl, and isobutyl alcohols, these are the ones which are particularly used, but without the invention being limited to this use.

The preparation according to the invention can be carried out at temperatures which are close to, equal or higher than the boiling point of the alcohol being used; in general, it is carried out between 50° and 150° C. In the most usual cases, in which the alcohol is methanol or ethanol, the alcoholysis takes place between 60 and 100° C.

The proportion of alcohol in carrying out the reaction (1) is generally from 2 to 50 moles per mole of thioester, and is preferably from 5 to 20 or better still 7 to 15.

The reaction is catalysed by acid substances, especially strong acids. Hydrochloric acid in a concentration from 0.5 to 5 percent of the reaction medium, and preferably from 1 to 3 percent, is particularly suitable.

The extraction of the formed thiol from the alcoholic medium can be carried out in practice by means of appropriate solvents, using the conventional extraction methods. Preferably at least the major part of the remaining alcohol is first of all eliminated by distillation, optionally under reduced pressure. As extraction solvents, it is for example possible to use the conventional liquids, such as ether, chloroform, etc.

As previously indicated, the groups R and $R_5$ are usually methyl and/or ethyl groups. However, it may be advantageous to use thioesters and heavier alcohols, for example, when it is desired to prepare, as well as the thiol, a certain particular ester. Thus, thioesters of various monothio or dithio acids can be used with alcohols, of which the radical $R_5$ can have one to 30 carbon atoms, in order to produce in the reaction (1), as well as the thiol, a certain particular $RCOOR_5$ ester. By way of example, it is possible for this purpose to use thioesters of acids such as thioacetic, thiobutyric, thiosuccinic, thiomaleic, thiostearic, thioacrylic, thiocrotonic, thio-oleic, thiobenzoic, thiotoluic, thiocinnamic or other acids.

The invention is found to be of particular importance when it is a question of preparing halogenated alkenyl thiols; it does in fact enable new compounds of this class to be prepared with yields much better than would be given by the application of the known methods.

Thus, it has been possible, by using the process of the invention, to prepare the following new thiols.

$CH_2=CCl—CH_2—SH$  2-chloro-2-propene thiol
$ClCH=CH—CH_2—SH$  3-chloro-2-propene thiol
$ClCH=CCl—CH_2—SH$  2,3-dichloro-2-propene thiol
$Cl_2C=CH—CH_2—SH$  3,3-dichloro-2-propene thiol
$Cl_2C=CCl—CH_2—SH$  3,3,2-trichloro-2-propene thiol The following examples illustrate the invention, but without limiting it.

EXAMPLE 1

Preparation of the 2-chloro-2-propene thiol

One hundred and fifty grams (1 mole) of 1-thioacetate of 2-chloropropenyl are brought to boiling point in solution in 500 ml. of methanol (12.5 moles of $CH_3OH$), containing 2 percent of HCl. The boiling is maintained under reflux for 3 hours.

The cooled reaction medium is subjected to extraction with ether; the ethereal layer, after washing with water and drying over anhydrous sodium sulfate, is subjected to distillation of the solvent. The residue, distilled under vacuum, leaves 87 g. of thiol $CH_2=CClCH_2SH$, which has the characteristics given here. (Yield 80 percent).

Boiling point at 150 mm.Hg=70° C.
$n_D^{20}=1.507$
Infrared spectrum: lines at $cm^{-1}$
2980–2940–2580–1640– 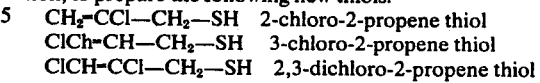 1420–1390–1250

EXAMPLE 2

Preparation of 3,3-dichloro-2-propene thiol

Sixty-four grams of 1-thioacetyl-3,3-dichloro-2-propene are heated for 3 hours under reflux in 160 ml. of a 2 percent HCl solution in methanol.

After cooling and extraction with chloroform, the extracted layer is washed with water and dried.

The chloroform is evaporated and the product which remains is distilled under vacuum.

Thirty-six grams of thiol are thus collected, this representing a yield of 72 percent with respect to the initial thioacetate.

The characteristics of the product are:

boiling point at 28 Hg=62° C.
$n_D^{20}$=1.508
infrared spectrum: cm$^{-1}$
3060–3000–2960–    2560–1630–1435
1290–1240–1190–    1070–1030–990
890–840–780–    690–600;

Elementary analysis %

|  | C | H | S | Cl |
|---|---|---|---|---|
| Calculated for $C_3H_4Cl_2S$ | 25.87 | 2.8 | 22.37 | 49.65 |
| Found | 25.76 | 3.01 | 21.82 | 49.96 |

EXAMPLE 3

Preparation of 3,3-dichloro-2-propene thiol by a method belonging to the prior art, as a comparison with example 2.

Twenty-five grams of 1,1,3-and 3,3,3-trichloropropenes are heated under reflux in methanol for 2 hours, in the presence of 10 g. of sodium acid sulfide.

After extraction with chloroform, evaporation of the latter and distillation of the formed product, there are collected 3 g. of thiol, of which the boiling point is 62° C./ 28 mm. Hg.

It is thus seen that the product of example 2 has in this case been obtained with a yield of only 12 percent.

EXAMPLE 4

Preparation of 3,3-dichloro-2-propene thiol, using another method of the prior art, as a comparison with example 2.

Thirty grams of thiourea are dissolved in 170 ml. of ethyl alcohol; 64 g. of trichloropropenes, the same as those in example 3, are added and heating under reflux takes place for 3 hours.

After cooling, the mixture is introduced into chloroformic solution, which is then treated with 10 percent sodium hydroxide solution and then with dilute hydrochloric acid.

From the chloroformic solution, decanted and dried over anhydrous sodium sulfate, the solvent is evaporated.

The remaining product gives, by distillation, 24 g. of thiol boiling at 62° C./28 mm. Hg.

The yield of the operation is thus 38 percent, as compared with 72 percent in example 2.

EXAMPLE 5

In a preparation similar to that of example 2, and before the extraction with chloroform, the major part of the methanol is eliminated by distillation; the yield obtained is then 83 percent.

I claim:

1. A process for the preparation of 2-alkenyl-thiols which comprises heating a 2-alkenyl thioester of the formula

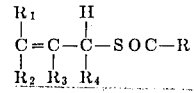

wherein $R_1$, $R_2$, $R_3$ and $R_4$ are individually selected from the group consisting of hydrogen, chlorine, bromine, alkyl of one to six carbon atoms, phenyl and tolyl, and wherein R is methyl or ethyl, the presence of an alcohol in an acid medium at a temperature close to the boiling point of the alcohol, and then extracting the formed thiol from the alcohol medium.

2. The process of claim 1 wherein R is methyl.

3. The process of claim 2 wherein the halogen is chlorine or bromine.

4. The process of claim 3 wherein $R_1$, $R_2$ and $R_4$ are hydrogen and $R_3$ is chlorine.

5. The process of claim 3 wherein $R_1$ and $R_2$ are chlorine and wherein $R_3$ and $R_4$ are hydrogen.

6. The process of claim 2 wherein at least one of $R_1$, $R_2$, $R_3$ or $R_4$ is alkyl of one to six carbon atoms.

7. The process of claim 1 wherein the alcohol employed is aliphatic and contains from one to four carbon atoms.

8. The process of claim 7 wherein the reaction is carried out at the boiling temperature of the alcohol.

9. The process of claim 1 wherein the reaction is carried out at 50–150° C.

10. The process of claim 1 wherein the molar proportion of alcohol to thioester is 2:1 to 50:1.

11. The process of claim 10 wherein the proportion of acid is about 0.5 to 5 percent by weight of the reaction medium.

12. The process of claim 1 wherein the thiol which is formed is extracted from the reaction medium by means of a solvent.

13. The process of claim 1 wherein the alcohol is methanol, ethanol or a mixture of methanol and ethanol.

14. The process of claim 13 wherein the reaction is carried out at between 60–100° C.

15. The process of claim 14 wherein the molar proportion of alcohol to thioester is 5:1 to 20:1.

16. The process of claim 15 wherein the acid is hydrochloric acid.

17. The process of claim 16 wherein $R_1$, $R_2$ and $R_4$ are hydrogen, $R_3$ is chlorine and R is methyl.

18. The process of claim 16 wherein $R_1$ and $R_2$ are chlorine, $R_3$ and $R_4$ are hydrogen, and R is methyl.

* * * * *